US010167990B2

(12) United States Patent
Riddiford et al.

(10) Patent No.: US 10,167,990 B2
(45) Date of Patent: Jan. 1, 2019

(54) CAMERA MOUNTING SYSTEM

(71) Applicant: TomTom International B.V., Amsterdam (NL)

(72) Inventors: Martin Riddiford, London (GB); Christopher James Taylor, London (GB); Frank De Jong, London (GB); Yu-Chyuan Tseng, New Taipei (TW); Hadyn Macquire Lyall Van Der Berg, Surbiton (GB); Jonathan Heath, Barnet (GB); Eveline Anna Kleinjan, London (GB)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 15/565,167

(22) PCT Filed: Apr. 29, 2016

(86) PCT No.: PCT/EP2016/059614
§ 371 (c)(1),
(2) Date: Oct. 9, 2017

(87) PCT Pub. No.: WO2016/174204
PCT Pub. Date: Nov. 3, 2016

(65) Prior Publication Data
US 2018/0094764 A1 Apr. 5, 2018

(30) Foreign Application Priority Data

Apr. 29, 2015 (GB) .................................. 1507347.1

(51) Int. Cl.
*G03B 17/56* (2006.01)
*F16M 11/04* (2006.01)
(Continued)

(52) U.S. Cl.
CPC ......... *F16M 11/041* (2013.01); *G03B 17/561* (2013.01); *G03B 17/566* (2013.01); *H04N 5/2252* (2013.01); *F16M 13/02* (2013.01)

(58) Field of Classification Search
None
See application file for complete search history.

(56) References Cited

U.S. PATENT DOCUMENTS 9,631,767 B2 * 4/2017 Kilgore ............. F16M 11/2064
2005/0045794 A1 3/2005 Richter
(Continued)

FOREIGN PATENT DOCUMENTS

GB 0784094 10/1957

OTHER PUBLICATIONS

International search report of international application No. PCT/EP2016/059614 dated Aug. 10, 2016.
(Continued)

*Primary Examiner* — W B Perkey

(57) ABSTRACT

A camera is disclosed comprising a substantially cylindrical camera body defining a longitudinal axis and a mounting system rotatably connected to the camera body, the mounting system comprising a base portion for mounting the camera to another object and at least one ring member arranged to surround the camera body and rotate around the longitudinal axis of the camera body during use.

19 Claims, 8 Drawing Sheets

(51) Int. Cl.
*H04N 5/225* (2006.01)
*F16M 13/02* (2006.01)

(56) References Cited

U.S. PATENT DOCUMENTS

| | | | |
|---|---|---|---|
| 2005/0062878 A1* | 3/2005 | Ogawa | H04N 5/232 348/372 |
| 2008/0013175 A1* | 1/2008 | Laganas | G03B 17/561 359/503 |
| 2008/0018782 A1* | 1/2008 | Terakado | H04N 5/2252 348/376 |
| 2010/0039552 A1* | 2/2010 | Kao | G06F 1/1607 348/373 |
| 2013/0063554 A1 | 3/2013 | Green | |

OTHER PUBLICATIONS

Search report of Great Britain (GB) application No. GB1507347.1 dated Aug. 10, 2015.
Search report of Great Britain (GB) application No. GB1507347.1 dated Nov. 30, 2015.
Search report of Great Britain (GB) application No. GB1507347.1 dated Nov. 26, 2015.

* cited by examiner

CAMERA MOUNTING SYSTEM

CROSS-REFERENCE TO RELATED APPLICATIONS

The present application is a National Stage of International Application No. PCT/EP2016/059614, filed on Apr. 29, 2016, and designating the United States, which claims benefit to United Kingdom Patent Application 1507347.1 filed on Apr. 29, 2015. The entire content of these applications is incorporated herein by reference.

FIELD OF THE INVENTION

This invention relates to cameras, including still cameras and particularly video cameras. Illustrative embodiments of the invention relate to video cameras for use during outdoor activities and action sports e.g. cycling, mountain biking, hiking, climbing, skiing and snowboarding, surfing, sky diving, sub-aqua diving, etc.

BACKGROUND OF THE INVENTION

It is known to mount still and video cameras so that they can record images or video during action sports, for example wearable video cameras can be mounted to a helmet, bicycle, surf board, etc. to capture action footage. So-called "action cams" can typically be mounted in different orientations, e.g. on a helmet, but the orientation of the camera is generally fixed once it has been mounted in a particular position. This can be problematic when activities do not take place on the level and the camera may be tilted or inverted during use. A horizon adjustment may be required to adjust the orientation of the horizontal image plane in relation to the mounting orientation of the camera body, e.g. during post-processing of video data recorded by the camera.

WO 2009/018391 A1 discloses a manual horizon adjustment control in the form of a rotary ring around the lens. Manual rotation of the ring during use of the camera either rotates the CMOS image sensor, so that post-processing is not required, or encodes the video data with the correct horizon so that post-processing adjustment is automatic. However this requires an additional manual adjusting step every time the mounting orientation is changed. WO 2012/037139 A2 shows examples of a camera mounted in different orientations with the lens manually rotated to provide for horizon adjustment.

SUMMARY OF THE INVENTION

According to a first aspect of the present invention there is provided a camera comprising a substantially cylindrical camera body defining a longitudinal axis and a mounting system rotatably connected to the camera body, the mounting system comprising a base portion for mounting the camera to another object and at least one ring member arranged to surround the camera body and rotate around the longitudinal axis of the camera body during use.

It will be understood that such a mounting system can be rotated around the camera body, so that the angular orientation of the whole camera can be adjusted relative to the mounting system (or vice versa). Thus, even once the base portion is mounted in position to an object such as a helmet, the camera body can still be rotated to adjust the horizon in the recorded image or video data. This allows a user to orientate the camera to the horizon without needing to adjust the lens and/or without an orientation sensor onboard. Usability is improved in this approach because it can be easier to grip and rotate the camera body, rather than trying to manually rotate just a lens or lens ring, especially if the user is wearing gloves for outdoor activities. This can also involve much lower risk of smudging the lens. Preferably the lens is substantially fixed relative to the camera body. In other words, the lens may rotate through small angles e.g. for focusing purposes, but preferably the lens does not rotate through angles of 90° or more.

The camera may be a still camera, but is preferably a video camera, e.g. suited for live action filming. Furthermore, the camera is preferably a digital image or digital video camera.

In a preferred set of embodiments the camera comprises a user interface arranged on a side wall of the substantially cylindrical camera body. This means that the user interface rotates with the camera body relative to the mounting system. Advantageously, once the mounting system has mounted the camera to an object, the camera body can be rotated so that the user interface is an accessible position, e.g. on top of the camera. This allows the camera to be mounted in a number of different ways without interfering with useability of the user interface. Rotation of the camera body relative to the mounting system can ensure that the interface is easily accessible regardless of the orientation of the mounting system. The user interface may be substantially planar, rather than extending circumferentially around the cylindrical camera body. This can improve accessibility of the user interface, e.g. after the camera body has been rotated to present the user interface on one side of the camera.

The user interface may comprise one or more input means for controlling the camera. The input means may be manually operable by a user. The input means may comprise one or more manually operable buttons. In one example the input means comprises a four-way button. In addition, or alternatively, the input means may comprise a touch screen. Such a touch screen may also provide the user interface with a display function.

In at least some embodiments it is preferable for the camera to comprise a display, in addition to the user interface, that is separate from the user interface. The display may be positioned in the same plane as the user interface or in a different plane. It may be preferable for the user interface and display to be arranged in substantially in the same plane, so that both are equally accessible/visible for a given orientation of the camera body. For example, the display and user interface may be arranged on the same side wall of the camera body. In a preferred set of embodiments the display and user interface may be arranged in a single integral casing, preferably forming a substantially planar unit. Such a planar unit may be arranged on a side wall of the camera body. So as to avoid user input from obscuring the display, the user interface may be spaced apart from the display, preferably along the longitudinal direction of the camera body. This spacing may be a feature of such a planar unit, where provided.

In a set of embodiments the camera may comprise a further user input arranged on a wall of the camera body and spaced apart from the user interface. The further user input may be provided on the same side wall of the camera body, but preferably the further user input is arranged on a different side wall or on an end wall. The further user input is preferably arranged in a plane at substantially 90° to the plane of the user interface. It will be understood that an end wall of the cylindrical camera body is one which is generally perpendicular to the longitudinal axis, whereas a side wall is one which is generally parallel to the longitudinal axis. Preferably the further user input is arranged on an end wall of the cylindrical camera body. Most preferably the further user input is arranged substantially centrally on the end wall, for example in coincidence with the longitudinal axis of the camera body. The further user input may therefore be found in the same position regardless of rotation of the camera body relative to the mounting system. Such a further user input may provide a specific function, for example controlling start and/or stop recording of video data. In one example the further user input comprises a one-way button.

Turning to the mounting system, the camera's useability can be enhanced by enabling the camera body to be mounted in a number of different orientations. In various embodiments, the ring member(s) may be arranged to rotate around the longitudinal axis of the camera body by up to 90°, 180°, 270° or even rotation through substantially 360°. However, at least in embodiments where the camera comprises a user interface on a side wall of the camera body, it may be preferable to limit the total range of rotation to a maximum of up to about 270° or less, preferably up to about 180°. Such a range of rotation may be defined with reference to the position of the user interface, where one is provided. In a preferred set of embodiments the mounting system is arranged to have a neutral position where its base portion is at an opposite side of the camera body to the user interface. In other words, the base portion may be diametrically opposite the user interface in this neutral position. The ring member(s) may be arranged to rotate around the longitudinal axis of the camera body by up to about ±90° relative to such a neutral position. This means that the base portion of the mounting system does not have to rotate past the user interface, or other components, on an opposite side wall of the camera body. Otherwise clearance may be needed between the mounting system and the camera body, for example between the base portion and the camera body. This may also avoid interference with the way in which the base portion mounts the camera to another object.

The ring member(s) could be arranged to rotate substantially freely around the longitudinal axis of the camera body during use, allowing for ease of adjustment in the camera's angular position. However the weight distribution of the camera may result in a tendency for the camera body to rotate relative to the mounting system rather than staying in a mounting position chosen by a user. It may therefore be preferable for the mounting system to include some resistance to rotation of the ring member(s) relative to the camera body. This could be achieved, for example, by providing a friction lining between the ring member(s) and the camera body. In a preferred set of embodiments, at least one of the ring members comprises a toothed internal surface. The toothed internal surface provides some resistance to rotation, so the mounting system must be forcibly rotated relative to the camera body. This enables a user to adjust the rotational position of the camera without it easily slipping out of position. The toothed internal surface may form part of a two-way ratchet mechanism, which preferably comprises two ratchet springs; one ratchet spring for the positive (clockwise) rotation relative to the neutral point, and the other ratchet spring for the negative (anti-clockwise) rotation relative to the neutral point.

In the mounting system, the base portion and at least one ring member may be separate parts that are connected together. However, it is preferable that the at least one ring member is integrally formed with at least part of the base portion. This can enhance the structural integrity of the mounting system. In addition, or alternatively, in a set of embodiments the mounting system may comprise two ring members spaced apart along the longitudinal axis of the camera body. The two ring members may be spaced apart by the base portion extending along the longitudinal axis of the camera body between the two ring members. Preferably the base portion is connected to both of the ring members. Each ring member may be integrally formed with at least a part of the base portion, either the same part or different parts. Where the base portion is formed of two or more different parts, they may be connected together by any suitable means, either directly or indirectly.

In a set of embodiments the mounting system comprises a pair of ring members, comprising a first ring member integrally formed with a first part of the base portion and a second ring member integrally formed with a second part of the base portion. The first and second parts of the base portion may be separate but connected together by a chassis or lever mechanism, as is described in more detail below.

The mounting system enables the camera to be mounted in position to another object, for example a helmet. The base portion of the mounting system may be mounted directly or indirectly to such an object. In various embodiments the mounting system is indirectly mounted to an object by a suitable mounting interface. The mounting system may be removably connected to such a mounting interface. The mounting interface may be adapted to a particular type of object, for example a surface mounting interface for a helmet (or other flat or slightly curved surface) or a clamping mounting interface for the handlebars of a bicycle (or other tube-shaped component).

The base portion may include one or more apertures, or any other feature, that enables a mounting interface to be removably connected to the mounting system. In a set of embodiments the base portion comprises a pair of levers arranged on top of one another to pivot in-plane and thereby enable connection or disconnection of a mounting interface to the mounting system. Such pivoting levers may act like a pair of scissors to clamp the base portion onto a mounting interface. Preferably the levers are substantially flat so as to minimise the profile of the base portion. Such pivoting levers may take the place of a chassis and act to connect together first and second parts of the base portion that, as described above, provide first and second ring members of the mounting system.

The use of a mounting system with a base portion comprising a pair of levers is seen to be new and advantageous in its own right. Thus, according to a second aspect of the present invention there is provided a camera comprising a mounting system including a base portion for mounting the camera to another object, wherein the base portion comprises a pair of levers arranged on top of one another to pivot in-plane to enable connection or disconnection of a mounting interface to the mounting system.

Each of the levers may include an aperture for receiving a corresponding feature of a mounting interface. Preferably the levers may be pivoted apart by a resilient member, such as a spring, so that the apertures are misaligned to thereby disable connection or disconnection of a mounting interface to the mounting system. A user must therefore force the levers together so that they are aligned one on top of the other before a corresponding feature can be engaged or disengaged. This may provide a quick-release mechanism for connecting the base portion to a mounting interface.

In such embodiments the mounting system of the camera may be removably connected to a mounting interface that is designed to engage with the base portion. The mounting interface may comprise one or more protruding T-bar features that mate with one or more corresponding apertures in the base portion, for example apertures formed in a pair of scissor-like pivoting levers. Such T-bar features may be chamfered to aid frictional engagement. Preferably the mounting interface is substantially planar except for the protruding T-bar features. However the mounting interface may have a lower surface that is flat or slightly curved, to enable the mounting interface to be seated on different objects. In addition, or alternatively, the mounting interface may comprise one or more portions formed of a compressible material, such as rubber. Such portions may be provided on any suitable surface of the mounting interface, but preferably on an upper surface that comes into contact with the mounting system and/or camera body. The portions of compressible material can improve the fit of the camera on the mount and help to absorb any vibrations arising from the object to which the camera is mounted, for example when the mounting interface is worn by a person during sport or physical activity The use of a mounting interface with protruding T-bar features and one or more portions of a compressible material is seen to be new and advantageous in its own right. Thus, according to a third aspect of the present invention there is provided a mounting interface for engaging with a mounting system of a camera, wherein the mounting interface comprises one or more T-bar features protruding from a surface of the mounting interface that are arranged to engage with corresponding apertures in the mounting system of the camera, and wherein the mounting interface further comprises one or more portions formed of a compressible material on the surface.

It is preferable for the mounting system to reflect the cylindrical geometry of the camera body, so that it can be rotated around the body easily. In a set of embodiments the base portion extends along the camera body and the at least one ring member extends substantially perpendicular to the base portion. Accordingly, the base portion may run along a side wall of the cylindrical camera body while the ring member(s) engage around a circumference of the camera body. In various embodiments the mounting system preferably comprises two ring members spaced apart by the base portion. As is described above, the two ring members may be integrally formed with one or more parts of the base portion.

The mounting system may be made of any suitable material(s) including, but not limited to, metallic and/or rigid plastics materials. Where the camera is intended to be used in harsh environments it may be important for the mounting system to be rugged and able to withstand shock. In a preferred set of embodiments the base portion and/or the or each ring member is formed of spring steel, preferably spring stainless steel. This can help to make the mounting system strong and resilient. The choice of spring steel for the ring member(s) can advantageously enable a snap-fit onto the camera body.

In various embodiments, a mounting interface may be connected to the base portion in a permanent or removable manner. In many embodiments it is preferable for a mounting interface to be removably connected to the base portion of the mounting system, so as to allow different mounting interfaces to be interchanged. A user may therefore attach a mounting interface that is suitable for mounting the camera to a particular object, for example a mounting interface designed to be fixed on a helmet or other sports equipment. Preferably the mounting interface is provided by one or more of: an adhesive mount, a strap mount, a chest mount, a tripod mount, a tripod adapter, a suction cup mount, a helmet mount, a board mount, a magnetic mount, a ball joint mount, a tongue and groove mount, a strap mount, a goggle mount, an arm mount, an articulated mount, a telescoping arm, or an adaptor for retrofitting to any other kind of mount. The mounting interface may be directly formed by such a mount or attached to such a mount as an intermediate interface. The mounting interface may comprise a flat or curved surface. The mounting interface may be made of a plastics material. This can facilitate injection moulding of the interface to easily achieve a desired shape and configuration.

Some further features will now be described which can enhance the compactness and useability of the camera. In a preferred set of embodiments the camera body houses a removable power pack comprising a battery module and a data storage module housed in a common casing to form an integrated unit. Such a power pack represents a completely different approach to the battery units normally connected to a camera, as it combines a battery module with a data storage module, such as a slot for a memory card or other data storage medium. This means that a user can quickly and easily swap the integrated unit to replace both battery and memory in one step, which is much more efficient especially when out action filming. Preferably the casing exposes one or more electrical connectors for transmitting power and data between the power pack and the camera during use. This can allow the camera to write image or video data files directly to the removable power pack. The one or more electrical connectors may provide for two-way data communication between the power pack and the camera. The camera may include a system-on-chip (SoC) processor for image and/or video data recorded in the data storage module.

A further advantage of the integrated nature of such a removable power pack is that it may more easily be made waterproof, water resistant or splash resistant e.g. using the common casing to protect both the battery module and data storage module. Furthermore, the Applicant has recognised that by combining both power and data in a single power pack it can be easier for the entire camera to be made waterproof. In a particularly preferred set of embodiments the power pack comprises a seal extending around a peripheral surface of the casing. When the power pack is installed in or on the camera body, the seal ensures that water cannot penetrate beyond the seal to reach the electrical connector(s). The seal may also prevent moisture from reaching other components of the battery module and/or data storage module. In this novel approach the power pack provides its own seal rather than trying to seal the multiple openings present in a conventional camera e.g. battery compartment and memory card slot. If the rest of the camera is waterproof then such a power pack means that an external waterproof casing may no longer be required. This represents a major advantage over existing action cameras. In particular, the seal means that the power pack can be removed and replaced directly from the waterproof camera. It is no longer necessary to open and close a separate waterproof case when swapping over the battery during use, making it quicker for a user with less risk of missing out on action footage. Preferably the camera has a water resistant rating of at least IPX7. This International Protection Marking, according to IEC standard 60529, rates the degree of protection provided against liquid intrusion by mechanical casings and electrical enclosures. A rating of IPX7 means that the camera can withstand immersion in water depths of up to 1 m for up to 30 minutes. In some embodiments the camera may have a water resistant rating of IPX8, meaning that it is waterproof in depths over 1 m, and preferably in depths up to 50 m. In other words, such a waterproof camera may withstand up to 5 atm of water pressure. Such a water-resistant or waterproof camera may be a still camera, but is preferably a video camera e.g. suited for live action filming.

Preferably the power pack is inserted at least partially into the camera body so that it is substantially protected by the camera body once installed. This can help to ensure that the power pack is shielded from knocks when the camera is used during sports activities. In a preferred set of embodiments the camera body comprises an open cavity arranged to receive the removable power pack therein. It is further preferable that the cavity has dimensions substantially matching the power pack such that, when the power pack is installed in the cavity, it forms part of a continuous surface of the camera body. Accordingly the power pack does not stand proud of the camera body, like a conventional add-on accessory, but integrates with the camera body. The resulting camera can be compact rather than bulky.

The cylindrical camera body may have an opening at one end for the cavity to receive the removable power pack. This can make it quick and easy for a user to install the power pack by sliding it axially into the cavity through the opening. It is convenient for the power pack to have a shape matching the cylindrical geometry of the camera body. The power pack may therefore be substantially circular in cross-section, with a circular geometry for the sealing interface (e.g. one or more O-rings). Preferably the power pack is substantially cylindrical in shape. In embodiments where the power pack is installed in an open cavity in the camera body, the cavity may also be substantially cylindrical.

The camera may further include one or more sensors. Such sensors may be chosen from one or more of: a microphone; an audio transmitter e.g. buzzer; a barometric altimeter; an accelerometer; a compass; or a pressure sensor. It is already mentioned above that the camera does not require an orientation sensor to adjust the horizon in recorded images or video, but the camera could still include an orientation sensor such as a gyroscope, for example a three-axis gyro.

In various embodiments the camera includes a wireless transceiver, for example a short-range transceiver using infrared or radio frequency communication (e.g. Bluetooth protocol). This can enable the camera to wirelessly connect with one or more external sensors or devices, such as a heart rate monitor, cadence sensor, power meter, GPS-enabled watch, mobile telecommunications device, etc. Data from such external sensors or devices may be integrated with the image or video data recorded by the camera, and/or used to control the image or video data recorded by the camera.

The present invention in accordance with any of its aspects or embodiments may include any of the features described in reference to other aspects or embodiments of the invention to the extent it is not mutually inconsistent therewith. Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

Figure 1:
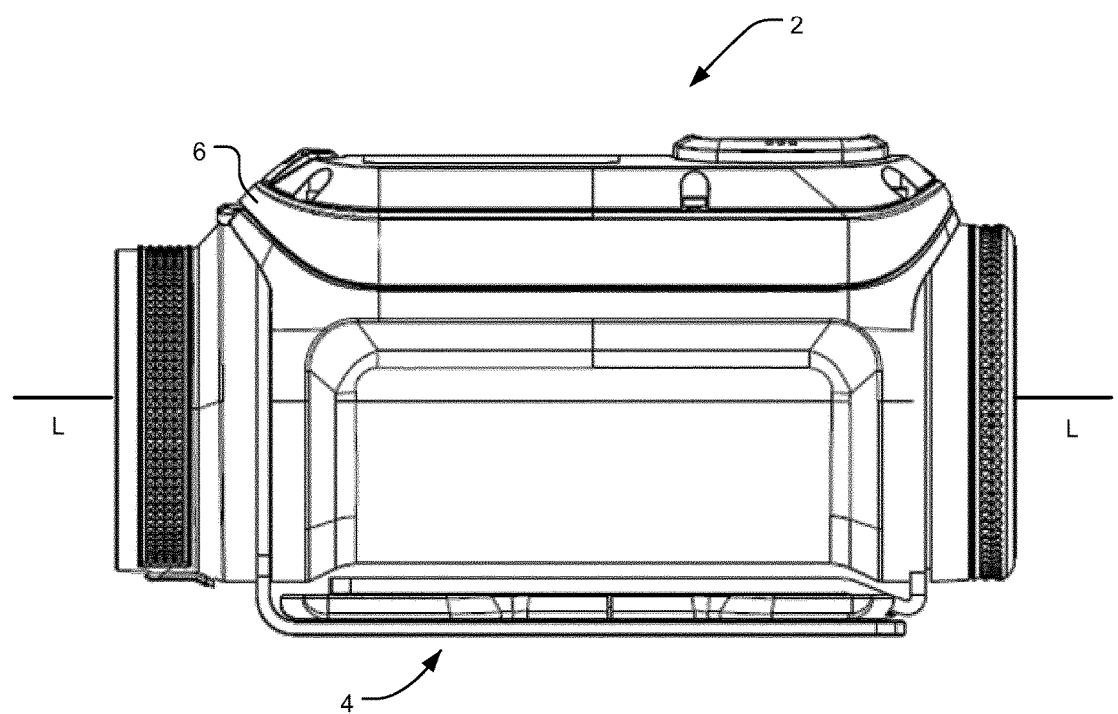
FIG. 1 is a side view of a camera and mounting system according to an embodiment of the present invention.

There is generally seen in FIG. 1 a camera 2 connected to a mounting system 4. The camera 2 has a cylindrical camera body 6 defining a longitudinal axis L. A lens barrel 18 is arranged on the longitudinal axis L. The mounting system 4 is rotatably connected to the camera body 6 such that the camera 2 can be rotated around the longitudinal axis L relative to the mounting system 4. This will be described in more detail below.

Figure 2:
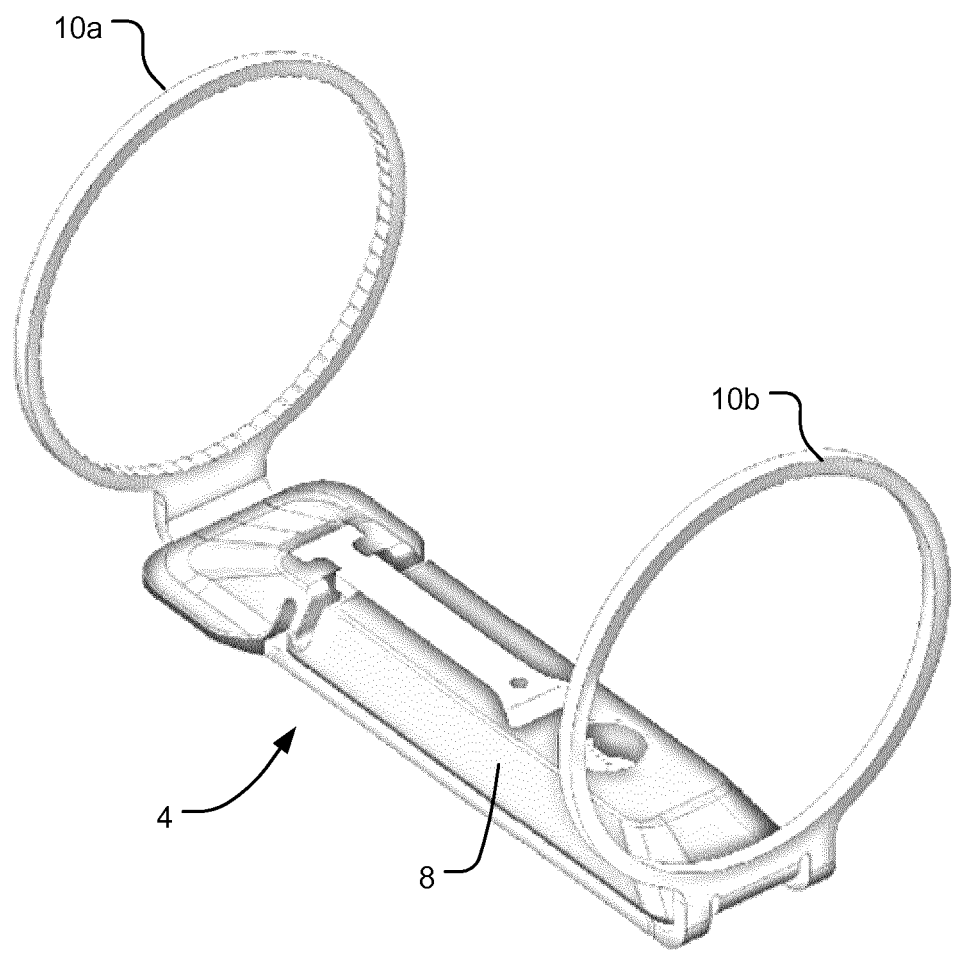
FIG. 2 is an assembled view of the mounting system.

FIG. 2 shows the mounting system 4 in an assembled state without the camera body 6 present. It can be seen that the mounting system 4 comprises a base portion 8 and a pair of ring members 10a, 10b that are sized so as to surround the camera body 6 when the mounting system 4 is connected to the camera 2. It may be seen that the ring member 10a which is positioned closest to the lens barrel 18 has a toothed internal surface. This provides friction so that the ring member 10a does not rotate freely and a user must apply enough force to move the toothed surface for the mounting system 4 to rotate.

Figure 3A:
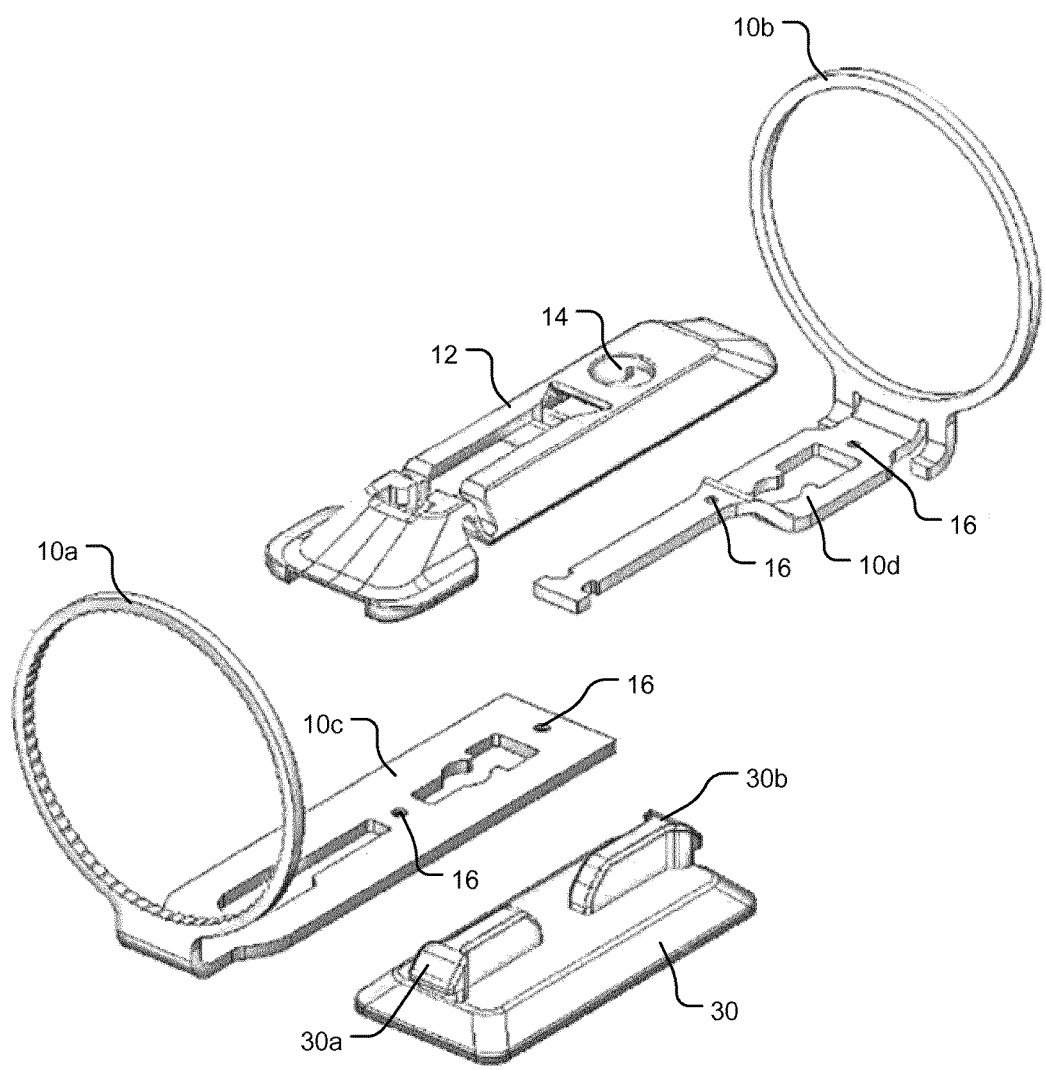
FIG. 3A is an exploded view of the mounting system of FIG. 2.

The exploded view of FIG. 3A shows the components of the mounting system 4 in more detail. Each of the ring members 10a, 10b is provided by an L-shaped piece of stainless spring steel, the ring members 10a, 10b extending at 90° to respective longitudinal members 10c, 10d which form part of the base portion 8. The base portion 8 is formed by connecting the longitudinal members 10c, 10d to a chassis plate 12. To hold the base portion 8 together, fastening screws are inserted through holes 16 in the two longitudinal members 10c, 10d. The chassis plate 12 is injection moulded from a plastics material and provides an interlocking shape that positions the two longitudinal members 10c, 10d so as to locate the two ring members 10a, 10b a fixed distance apart along the longitudinal axis L. The chassis plate 12 includes a clearance hole 14 that is sized to accept size ¼-20 UNC thread e.g. for a tripod.

Also seen in FIG. 3A is a separate mounting interface 30 that can be removably connected to the base portion 8 of the mounting system 4. The mounting interface 30 is shown as a plate having a flat bottom surface, but it may instead have a slightly curved surface e.g. for mounting to a helmet or handlebar. The mounting interface 30 is injection moulded from a plastics material and includes two protruding T-bar features 30a, 30b that mate with corresponding apertures in the two longitudinal members 10c, 10d of the base portion 8. The resilience of the spring steel, in combination with a chamfer on the T-bar features 30a, 30b, means that the mounting interface 30 can be gripped by the mounting system 4 to secure the camera 2 on the mount.

Figure 3B:
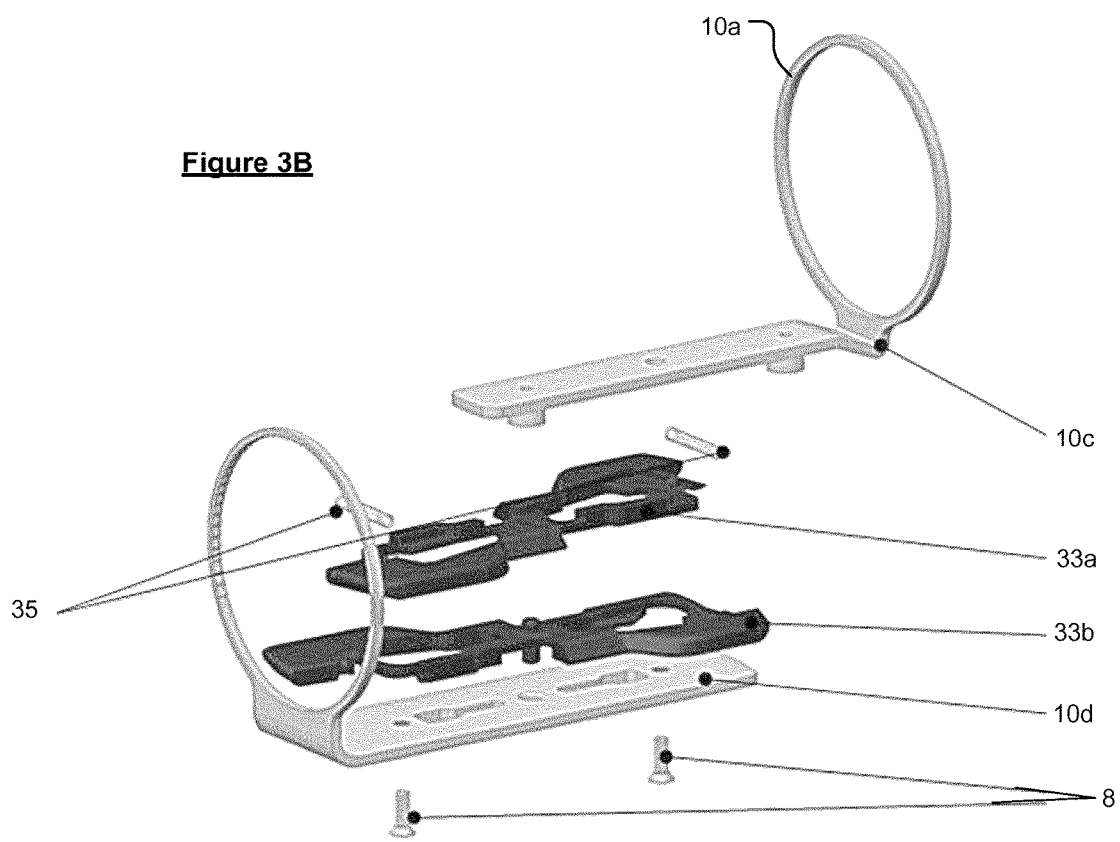
FIG. 3B is an exploded view of the mounting system according to another embodiment.
Figure 3C:
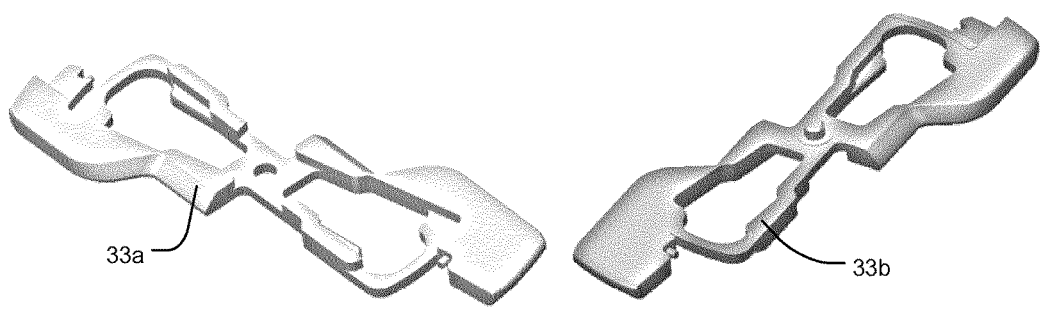
FIGS. 3C and 3D show some detail of the mounting system of FIG. 3B, FIGS. 3E and 3F show mounting interfaces for use with such mounting systems.
Figure 3D:
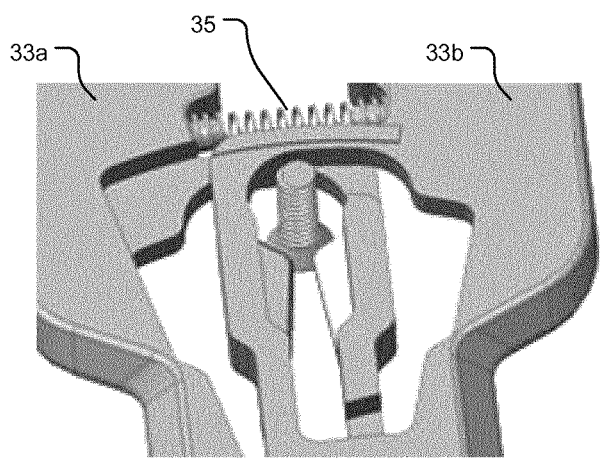

FIG. 3B shows an embodiment of the mounting system 4 in which the chassis plate 12 has been replaced by a pair of planar levers 33a, 33b that are sandwiched between the longitudinal members 10c, 10d in the base portion 8. The two levers 33a, 33b are connected together to pivot in their plane. The levers 33a, 33b are shown in more detail in FIG. 3C. As is seen in FIG. 3D, the levers 33a, 33b are forced to pivot apart by a spring 35. In order to demount the camera 2 from the mounting interface 30, the levers 33a, 33b can be pinched sideways to compress the spring 35 and align the levers 33a, 33b on top of one another. Alignment of apertures in the levers 33a, 33b allows the T-bar features 30a, 30b to be released from the base portion 8. The mounting interface 30 can therefore provide for a quick release.

Figure 3E:
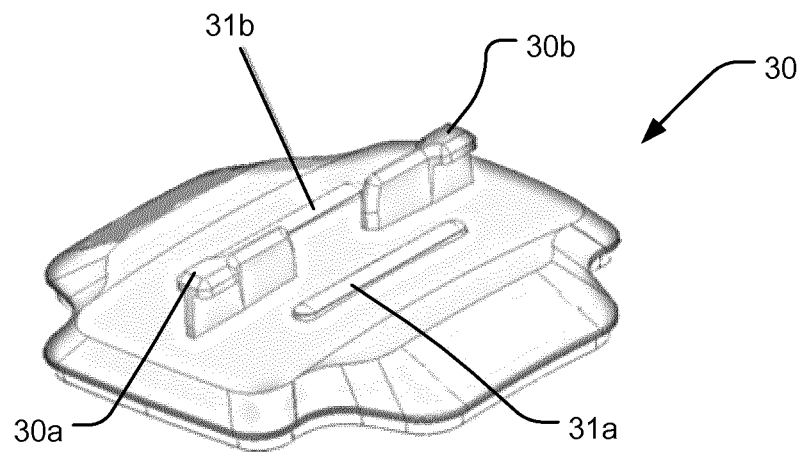
Figure 3F:
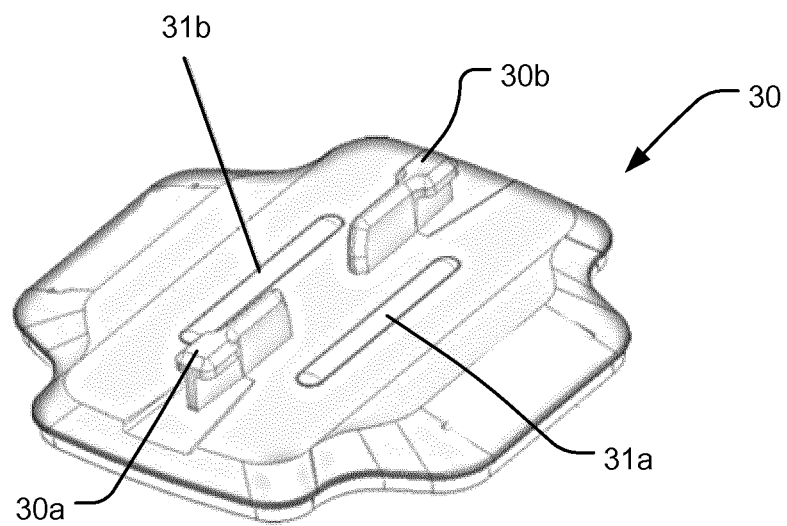

FIGS. 3E and 3F show some different versions of the mounting interface 30. In FIG. 3E the mounting interface 30 has a flat lower surface, whereas in FIG. 3F the mounting interface 30 has a curved lower surface. In both embodiments the mounting interface 30 includes a pair of protruding T-bar features 30a, 30b on its upper surface. In addition, the mounting interface 30 includes two strips 31a, 31b of compressible material. These strips 31a, 31b help to ensure that the camera body 6 is mounted without vibration.

Figure 4A:
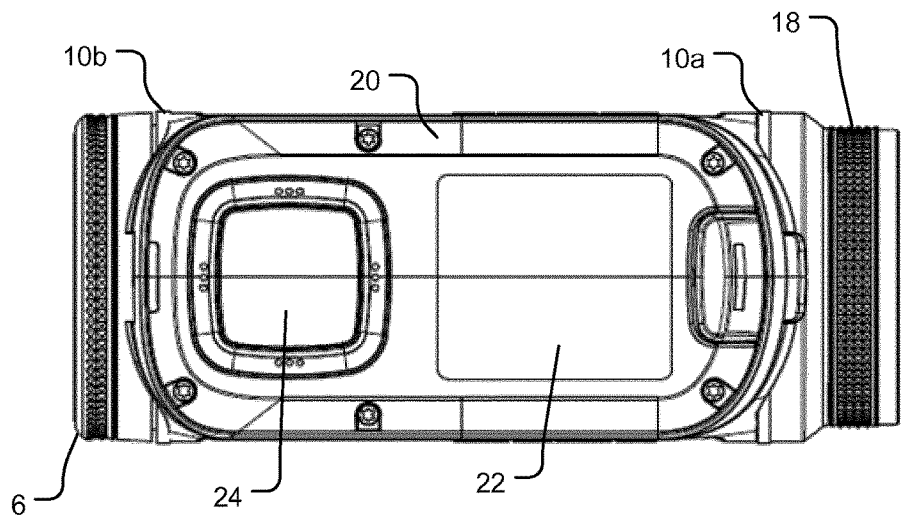
FIGS. 4A to 4C show various views of such a camera and mounting system.
Figure 4B:
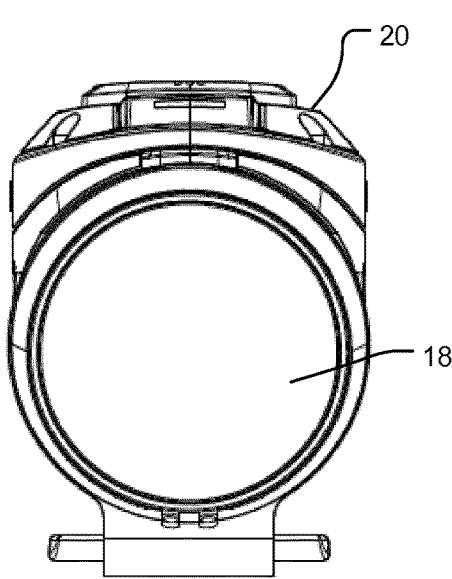
Figure 4C:
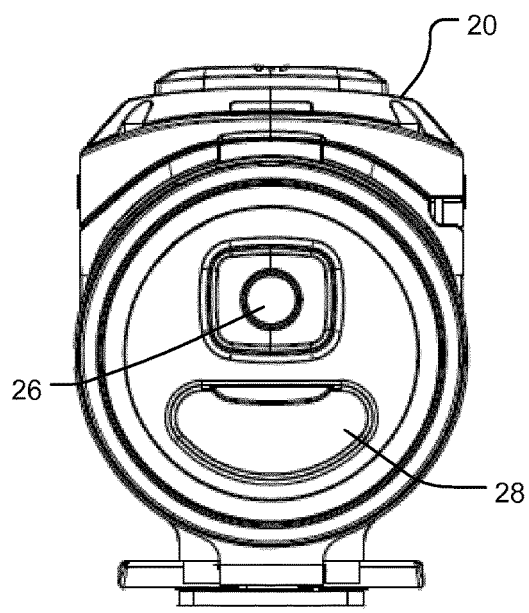

The different views seen in FIGS. 4A to 4C show the camera 2 connected to the mounting system 4 with the two ring members 10a, 10b surrounding the camera body 6.

As can be seen in FIGS. 4A to 4C, a user interface 20 is arranged on a top side wall of the camera body 6. The user interface 20 is a generally planar unit comprising a display 22 spaced longitudinally from a four-way manual input button 24.

As seen in FIG. 4C, another user control button 26 is exposed on a back end wall of the camera body 6. This user control button 26 may be carried on the end surface of a removable power pack that is inserted into the camera body 6. As the user control button 26 is positioned centrally in the back end wall of the camera body 6, it remains centred on the longitudinal axis L despite rotation of the camera 2 relative to the mounting system 4. Below the user control 26 there is seen an auxiliary input port 28 allowing an auxiliary power supply cable to be connected to the camera 2, in particular to a power pack installed in the camera body 6. This may be used, for example, to recharge the battery of the camera 2.

Figures 5A, 5B:
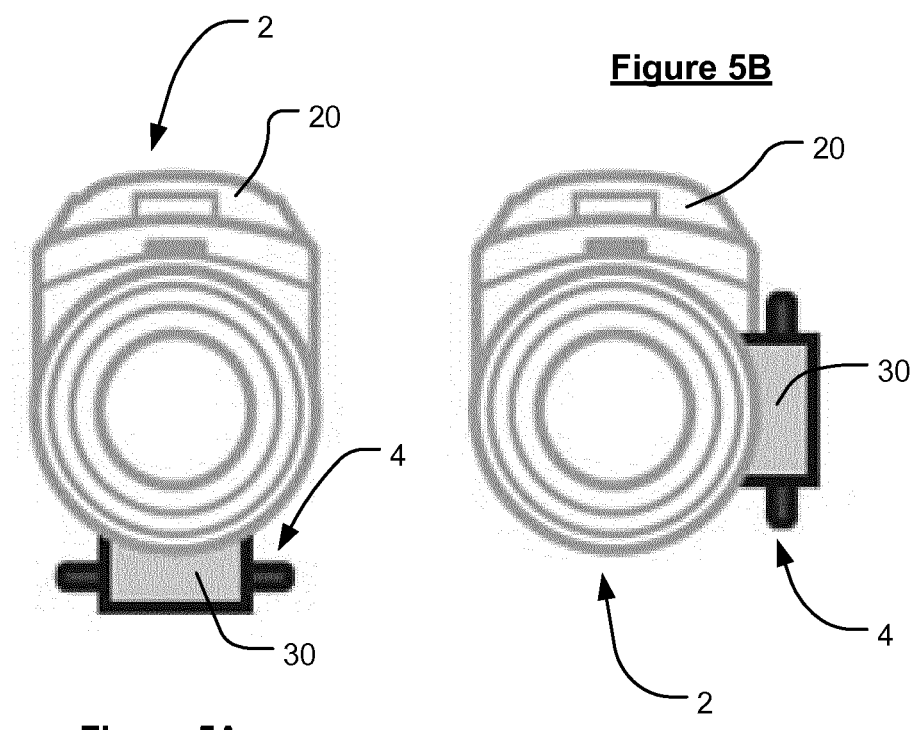
FIGS. 5A and 5B show a front view of such a camera with the mounting system rotated through 90°.

FIGS. 5A and 5B provide a front profile view of the camera 2 in two different positions. In FIG. 5A the camera 2 is mounted in a vertical (neutral) position, with the user interface 20 positioned above the base portion 8 of the mounting system 4 i.e. at an angle of 180°. In FIG. 5B the mounting system 4 has been rotated through 90° relative to the camera 2, so that the user interface 20 remains in the same vertical position but the camera 2 can be mounted onto the side of an object rather than on top of an object. The mounting system 4 may be rotated by +/−90° from the vertical (neutral) position so as to enable the camera 2 to be mounted from either the right or left side. Furthermore, rotation through a range of greater than 180° may be possible by providing clearance between the base portion 8 of the mounting system 4 and the camera body 6, so that the mounting system 4 can be rotated even further.

The mounting system 4 may be removably connected onto an object such as a helmet, handlebar, or the like by any suitable mounting interface. A mounting interface may be in the form of a ball mount, which would allow the mounting system 4 to be tilted and rotated through a range of angles, in addition to rotation of the camera 2 relative to the mounting system 4. This further increases the flexibility available in the number of different ways that the camera 2 can be mounted.

The invention claimed is:

1. A camera, comprising:
    a substantially cylindrical camera body defining a longitudinal axis;
    a lens barrel arranged on the longitudinal axis; and
    a mounting system rotatably connected to the camera body, wherein the mounting system comprises:
        a base portion for mounting the camera to another object, the base portion extending along a side wall of the camera body; and
        at least one ring member engaging around a circumference of the camera body, such that the mounting system is rotatable around the camera body.

2. The camera of claim 1, comprising a user interface arranged on a side wall of the substantially cylindrical camera body.

3. The camera of claim 2, wherein the user interface is substantially planar.

4. The camera of claim 2, wherein the user interface comprises one or more manually operable buttons.

5. The camera of claim 2, comprising a display arranged substantially in the same plane as the user interface.

6. The camera of claim 5, wherein the display is spaced apart from the user interface.

7. The camera of claim 2, comprising a further user input spaced apart from the user interface and arranged on an end wall of the substantially cylindrical camera body.

8. The camera of claim 1, wherein the range of rotation of the at least one ring member is limited to a maximum of up to about 180°.

9. The camera of claim 1, wherein the at least one ring member comprises a toothed internal surface.

10. The camera of claim 1, wherein the mounting system comprises two ring members spaced apart by the base portion extending along the longitudinal axis of the camera body between the two ring members.

11. The camera of claim 1, wherein the or each ring member is integrally formed with at least a part of the base portion.

12. The camera of claim 1, wherein at least one of the base portion and the at least one ring member is formed of spring steel.

13. The camera of claim 1, wherein a mounting interface is removably connected to the base portion of the mounting system.

14. The camera of claim 1, wherein the camera body houses a removable power pack comprising a battery module and a data storage module housed in a common casing to form an integrated unit.

15. The camera of claim 14, wherein the casing exposes one or more electrical connectors for transmitting power and data between the power pack and the camera during use.

16. The camera of claim 15, wherein the one or more electrical connectors provide for two-way data communication between the power pack and the camera.

17. The camera of claim 14, wherein the power pack comprises a seal extending around a peripheral surface of the casing.

18. The camera of claim 1, wherein the camera is a video camera.

19. The camera of claim 1, wherein the mounting system is rotatable around the longitudinal axis of the camera body.

* * * * *